No. 862,405. PATENTED AUG. 6, 1907.
G. LANOIR.
TIRE CLENCHER AND RIM.
APPLICATION FILED NOV. 4, 1905.

2 SHEETS—SHEET 1.

Witnesses
John P. Duffie.
Henry Roberts.

Inventor
George Lanoir,
By John S. Duffie,
Attorney

No. 862,405. PATENTED AUG. 6, 1907.
G. LANOIR.
TIRE CLENCHER AND RIM.
APPLICATION FILED NOV. 4, 1905.

2 SHEETS—SHEET 2.

Witnesses
John P. Duffie.
Henry Roberts.

Inventor
George Lanoir
By John S. Duffie,
Attorney

UNITED STATES PATENT OFFICE.

GEORGE LANOIR, OF WASHINGTON, DISTRICT OF COLUMBIA.

TIRE CLENCHER AND RIM.

No. 862,405.　　　　　Specification of Letters Patent.　　　Patented Aug. 6, 1907.

Application filed November 4, 1905. Serial No. 285,940.

*To all whom it may concern:*

Be it known that I, GEORGE LANOIR, a citizen of the United States, residing at Washington, District of Columbia, have invented new and useful Improvements in Tire Clenchers and Rims, of which the following is a specification.

My invention has relation to new and useful improvements in wheel rims and tire clenchers used in connection with pneumatic tires.

The object of my invention is to provide a wheel rim construction with improved tire clencher for locking the tire in connection with the rim and to so construct and arrange said tire clencher to admit of the tire being readily and easily applied to or removed from the rim; to so construct my improved rim and tire clencher as to allow the same being used in connection with the tires of different makes.

Heretofore it has been customary with manufacturers to construct rims for vehicle wheels of designs peculiarly and individually adapted to receive certain particular makes of tires, and these rims as a consequence are not so constructed as to receive tires of any other make or description, and from this it follows as a natural sequence that the owner of a vehicle having the rims of its wheels constructed to retain one make of tire, is not able to make use of another tire of different make, no matter how great the exigencies therefore may be. By using my improved rim and tire clencher this difficulty is overcome, as a tire of wholly different construction than the one in use may be mounted on the wheels of the vehicle, and by a person of simple or no mechanical ability. A sample of the need of this resource in this construction of rims and tire clenchers would be where the operator of a vehicle equipped with a peculiar form of tire meets with an accident which absoultely renders one or more of the tires unfit for service at a location where others of similar make are unobtainable, but other tires of a wholly different make are procurable.

With these ends in view my invention consists in the novel construction, combination, and arrangement of parts as set forth in the specification and claims hereunto attached.

In the accompanying drawings, in which like parts are designated by like characters throughout the several views:—

Figure 1:
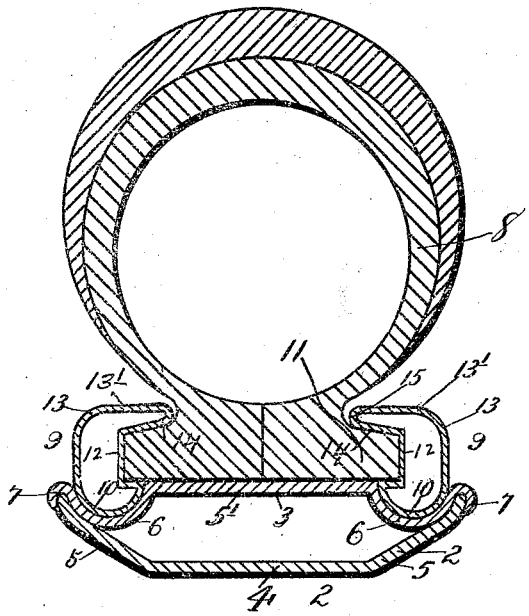
Figure 2:
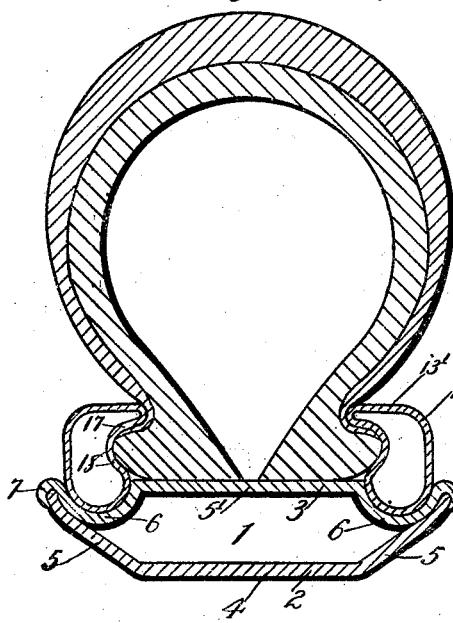
Figure 3:
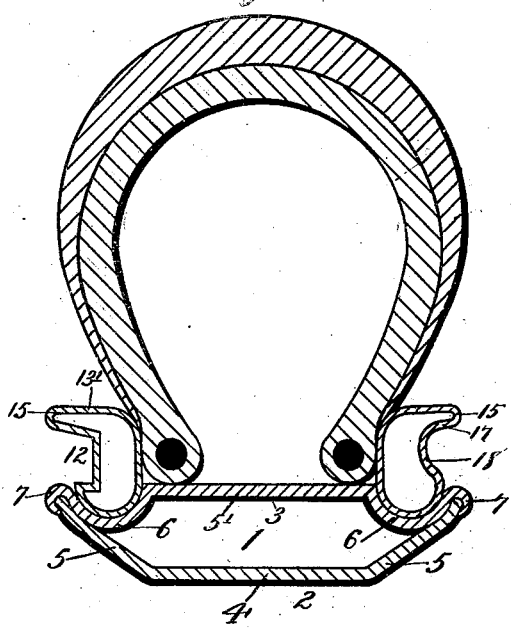
Figure 4:
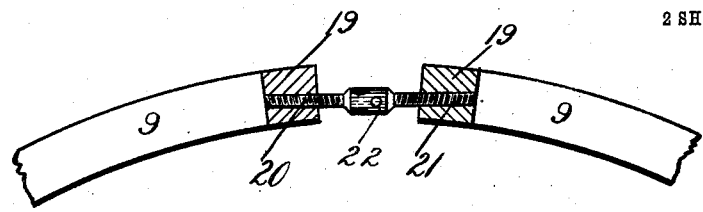
Figure 5:
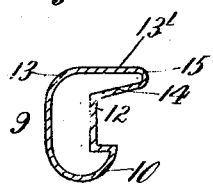
Figure 6:
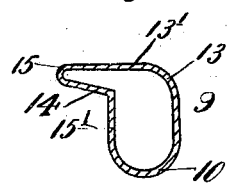
Figure 7:
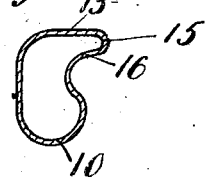
Figure 8:
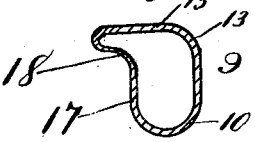
Figure 9:
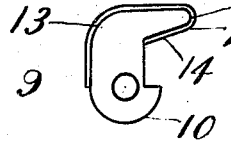
Figure 10:
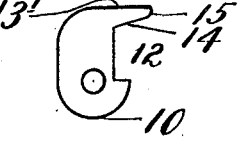
Figure 11:
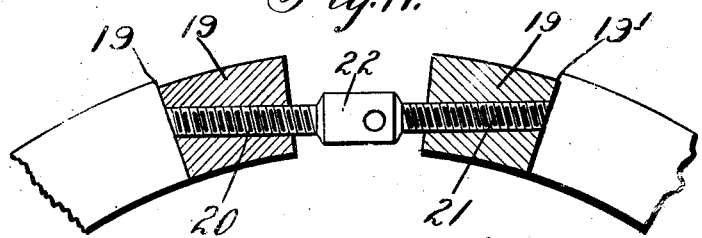

Figure 1, is a transverse sectional view of my improved rim and tire clencher applied to a Fisk tire, also shown in section. Fig. 2, is a transverse sectional view of my improved rim and modification of my clencher, applied to a G. and J. tire, also shown in transverse section. Fig. 3, is a transverse sectional view of my improved rim and my tire clencher applied to one side of a Dunlop tire, also shown in cross section, and the modification of my tire clencher shown in transverse section and reversed and applied to other side of said tire. Fig. 4, is a side elevation of a section of my tire clencher, showing how the same may be caused to be greater or less in relation to its periphery by means of a device consisting of a turn buckle and right and left thread. Fig. 5, is a cross sectional view of my tire clencher. Fig. 6, is a cross sectional view of a modification of my clencher. Fig. 7, is a cross sectional view of another modification of my invention. Fig. 8, is a cross sectional view of still another modification of my tire clencher. Fig. 9, is an end view of my clencher, with a cap applied thereto to cover the joint at the abutting ends of the clencher. Fig. 10, is an end view, the flange being shortened and narrowed. Fig. 11, is a side elevation of a section of my tire clencher, the upper parts of the adjacent ends being recessed the thickness of the cap.

My invention is described as follows:—The numeral 1, represents my improved rim, which may be constructed of any desired material, and is composed of two separate and distinct parts, an inner member 2, and outer tire bearing member 3. Said inner member consists of a central horizontal part 4, and two integral oblique outer parts 5. Said tire bearing member 3, consists of a central horizontal part $5^1$, equal in width to said central part 4, of said member 2, and two semi-circular integral outer parts 6, which terminate in lips 7. Said oblique outer parts 5, of said inner member 4, are bent to extend upwardly and outwardly at an angle necessary to bring their outer edges in contact with and tangent to the outer faces of said semi-circular parts 6, of said outer member 3. Said parts 5 are then turned to conform with the curvature of said semi-circular parts 6. When said members are brought together, said lips 7, of said outer member 3, overlap the upper curved edges of said parts 5. Thus it will be seen that our rim consists of two parts, 2 and 3, and as the inner part 2, is not integral with the outer part 3, the rim therefore has considerable elasticity, or rebound, because there is play of the oblique parts 5, in lips 7. This elasticity makes the vehicle more easy to ride in, even where the pneumatic tire is not sufficiently inflated, and this construction also modifies the jars to the vehicle on rough roads, and thereby renders it less liable to be broken; and should the outer part 3, be injured or broken, it could be easily and quickly repaired, or substituted by a new one, without removing the inner part from the wheel; thus we gain three advantages in making our rim in two parts.

The numeral 8, (Fig. 1) represents a Fisk tire. Said tire is mounted on my improved rim in such a manner as to bring the central point of its base immediately over the center of said rim.

The numeral 9, represents my improved tire clencher. Said clencher partly consists of a semi-circular base 10, having its inner side corresponding with the outer periphery of the semi-circular parts 6, of said member 3.

Said clencher is then cut horizontally outward a distance equal to the distance between the point of contact of the base of said tire with one of the extreme outer ends of said tire bearing member 3, and one of the extreme outer ends of said tire base, and then vertically a distance equal to the height of said tire flange, forming right angled vertical depressions 12. The upper outer shoulder 13 of said clencher is then cut with a radius equal to the radius used to cut the inner periphery of said base 10. The outer wall 13¹ of said clencher then extends horizontally inward parallel with the base of said tire. Said clencher is also provided with an oblique wall 14, which corresponds with the slant of the flange of a Fisk tire. Said upper wall 13¹, oblique wall 14, and semi-circular wall 15, constitute a flange, which is twice and a half as long as the depth of said depression 12. (See Fig. 5). Said clencher may be reversed and applied to a Dunlop tire. (See Fig. 3).

Although my tire retainer is preferably constructed in the manner just described, I do not confine myself to this specific construction, but claim the right to do away with said depression 12, and use a vertical wall 15¹. (See Fig. 6). This form or modification of my clencher is adapted to be used in connection with the Dunlop tire. It must, however, be reversed in relation to its position as shown in Fig. 6.

Another manner of constructing my tire clencher is to dispense with the said obliquely slanting wall 14, and substitute therefor a substantially horizontal wall 16 (see Fig. 7) which extends inwardly parallel with the wall 13¹. In this case, however, the semi-circular wall 15 connecting the walls together must be cut with a greater radius than the one used in preceding cases. This modification of my clencher may also be applied to a Dunlop tire, but must be reversed in relation to its position as shown in Fig. 7.

In another manner of constructing my clencher, (see Fig. 8) while I use the semi-circular base 10, shoulder 13, and semi-circular wall 15, I dispense with said oblique wall 14, vertical wall 15¹, and substantially horizontal wall 16, and use a wall consisting of a curved part 17, and a substantially but not exactly semi-circular part 18, made up of a series of different radii united, or in other words, such an irregular curve as will conform with the shape of the outer edge of the flange of a G. and J. or clencher tire. This style of clencher may also be used in connection with a Dunlop tire by reversing same.

My improved tire clencher may be caused to shrink or enlarge in relation to its periphery by providing the ends of said clencher with lugs 19, provided with internally right and left threaded bores and employing a device consisting of a right thread 20, left thread 21, and turn buckle 22. The numeral 23, represents a cap I employ to cover and protect said right and left threads, 20 and 21, respectively, and turn buckle 22. This is the preferable shape of my clencher, but sometimes I make my clencher with slight recesses 19¹ at each end so as to allow said cap to be applied thereto without increasing the size of the cap 23, and leaving the clencher uniform. I get this required shape and size by recessing the upper walls of the ends of said clencher slightly, and setting the oblique wall 14 up a little, and slightly shortening the flange.

By providing a rim construction in the manner just described and employing my improved tire clencher or one of its modifications, I have produced a rim and tire clencher, which, while simple in construction and easily and cheaply manufactured, may not only be used in connection with the three leading makes of tires, Fisk, G. and J. and Dunlop, but other clencher tires.

Having described my invention what I claim as new and desire to secure by Letters Patent, is:—

1. In a tire retaining device, the combination of a rim 1, made in two parts, an inner member 2, an outer tire bearing member 3, said inner member consisting of a horizontal central part 4, and two integral lateral parts 5; said member 3, consisting of a central horizontal part 5¹, equal in width to said part 4, and two semicircular outer parts 6, terminating in lips 7, overlapping and adapted to slide on the edges of the upper curved parts 5, when said members are brought together, substantially as shown and described and for the purposes set forth.

2. In a tire clenching device, the combination of the inner part 2, consisting of the horizontal central part 4, and the oblique upturned edges 5; tire bearing part 3, consisting of the horizontal part 5¹, and two semicircular parts 6, one on each side of said part 5¹, terminating in lips 7, grasping the outer edges of said parts 5, and adapted to slide thereon, and tire clenchers, adapted to be seated in said semicircular parts 6, their upper parts adapted to impinge against the walls of the inner periphery of a pneumatic tire, and hold the same firmly to the rim 1, substantially as shown and described and for the purposes set forth.

3. In a tire clenching device, a clencher having lugs at each end, provided with internally threaded right and left bores, a turnbuckle rod having right and left threaded ends, adapted to enter said bores, said clencher being recessed at each end, its base adapted to rest in the semicircular part of the outer rim, its upper part adapted to impinge against one side of the inner wall of a pneumatic tire, and a cap to fit over and cover the said depressions and said turnbuckle rod, substantially as shown and described and for the purposes set forth.

In testimony whereof I affix my signature, in presence of two subscribing witnesses.

GEORGE LANOIR.

Witnesses:
C. M. FORREST,
JOHN P. DUFFIE.